(12) United States Patent
Hsu

(10) Patent No.: US 7,733,645 B2
(45) Date of Patent: Jun. 8, 2010

(54) THIN DISPLAY STRUCTURE

(75) Inventor: Hui-Hsiung Hsu, Chung Ho (TW)

(73) Assignee: AmTRAN Technology Co., Ltd, Taipei (TW)

(*) Notice: Subject to any disclaimer, the term of this patent is extended or adjusted under 35 U.S.C. 154(b) by 794 days.

(21) Appl. No.: 11/702,107

(22) Filed: Feb. 5, 2007

(65) Prior Publication Data
US 2008/0186661 A1 Aug. 7, 2008

(51) Int. Cl.
G06F 1/16 (2006.01)
(52) U.S. Cl. ............... 361/679.59; 361/679.22; 248/188.1; 248/188.8; 248/346.1
(58) Field of Classification Search ............. 361/679.59
See application file for complete search history.

(56) References Cited

U.S. PATENT DOCUMENTS 5,388,792 A * 2/1995 Hastings et al. .......... 248/188.1
5,588,625 A * 12/1996 Beak ..................... 248/371
6,288,893 B1 * 9/2001 Faranda et al. ........... 361/679.6
6,311,941 B1 * 11/2001 Feldmeyer ............... 248/188.8
6,603,656 B2 * 8/2003 Cho et al. .............. 361/679.02
7,328,880 B2 * 2/2008 Helot et al. ............. 248/346.01
2003/0081376 A1 * 5/2003 Helot et al. ................ 361/683
2007/0047188 A1 * 3/2007 Kim ........................ 361/681
2007/0086154 A1 * 4/2007 Koch ....................... 361/681

* cited by examiner

Primary Examiner—Jayprakash N Gandhi
Assistant Examiner—Anthony Q Edwards
(74) Attorney, Agent, or Firm—Rabin & Berdo, P.C.

(57) ABSTRACT

A thin display structure including a case, at least two joining sleeves disposed at the bottom of the case, and at least two support units with the transverse width similar to the thickness of the case is provided. The support units are rotatably disposed in the joining sleeves, such that the support units can rotate with respect to the case, so as to have a receiving position hiding in the case and a supporting position protruding from the case. In the receiving position, the thin display can be received in a packing case or hung on a wall surface, and in the supporting position, the thin display can stand on a plane.

19 Claims, 15 Drawing Sheets

THIN DISPLAY STRUCTURE

BACKGROUND OF THE INVENTION

1. Field of Invention

The present invention relates to a display structure. More particularly, the present invention relates to a thin display structure with a rotatable support unit.

2. Related Art

Compared with a conventional cathode ray tube display (CRT DISPLAY), a thin display, such as a liquid crystal display television (LCD TV) or a plasma display panel television (PDP TV), not only has advantages of being light in weight, and compact in size, and occupying a relative small space, but also has various functions of externally connecting to a computer, and audio-visual home appliances, and thus the thin display has generally become a standard device for the current digital family.

The thin display generally has a foot for supporting the thin display to be placed on a TV cabinet, and the area of the foot is generally larger than the thickness of the thin display, so as to stably support the thin display to stand on the TV cabinet. Currently, the thin display has gradually developed from more than ten inches to more than fifty inches or even seventy or eighty inches, that is, the size of the thin display has become increasingly large. Thus, in order to support the thin display stably, the volume of the foot is enlarged accordingly to enhance the stability of the supporting.

The foot of the conventional thin display is designed to be directly fixed to the bottom of the display, or designed to be detachable from the bottom of the display. No matter it is fixed or detachable, since the foot occupies a certain volume, the manufacturers must consider the volume of the external packing case of the thin display for receiving the foot, and thus the volume of the external packing case must be much larger than that of the thin display. However, if the required volume of the packing case is increased only for receiving the foot, a relatively large freight space is occupied, and under the same fixed freight space (e.g., a standard container), the loaded amount is relatively small, thus increasing the transportation cost.

Furthermore, besides being placed on the TV cabinet, the current thin display also can be directly hung on the wall surface in the room due to its small thickness. However, if the user hangs the thin display on the wall surface, the foot originally disposed on the thin display must be detached and put way in another place, thus causing inconvenience to the user.

SUMMARY OF THE INVENTION

According to the above conventional art, the foot of the thin display increases the space of the package, and thereby increasing the transportation cost. If the thin display is hung on the wall surface, the foot must be detached, which is inconvenient to the user. Accordingly, the present invention is directed to providing a thin display structure with a rotatable foot.

The thin display structure according to the present invention includes a case, at least two joining sleeves, and at least two support units. The case is used to cover a display panel. Two joining sleeves are disposed inside the bottom of the case, in which a joining sleeve includes a chamber, and a resilient arm is disposed on one side of the wall surface of the chamber, and a stop block is disposed on a top edge of the inner wall surface of the chamber, and a shaft bore communicating with the chamber is further disposed in the joining sleeve. A support unit includes a chassis with a transverse width similar to the thickness of the case, and a guide post extending from one end surface of the chassis and matched and sleeved in the chamber. The guide post has two retaining walls pressing against the stop block, and more than one buckling slot corresponding to the resilient arm. A via hole communicating with the chassis and the guide post is further disposed in the support unit. A shaft rod passes through the shaft bore and the via hole, such that the support unit is rotatably disposed in the joining sleeve, and when the stop block is pressed against the retaining wall and the resilient arm is buckled in the buckling slot, the support unit has a receiving position hiding in the case and a supporting position protruding from the case.

In the thin display structure according to the present invention, the support unit is designed to be rotatably disposed. As for the manufacturers, when packing after finishing the manufacturing process, the support unit can be hidden in the bottom of the case, and from the perspective of the external appearance, the support unit does not protrude from the thin display. Besides selecting some necessary buffer material, the packing case can be designed to be approximate to the volume of the thin display, so as to increase the amount loaded in the freight space, thereby enhancing the transportation efficiency, reducing the package cost and the transportation cost. Furthermore, the rotation of the support unit can be achieved simply through manual operation, without requiring any other tools. When the user intends to hang the thin display on the wall surface, it can be achieved by directly rotating the support unit without detaching the support unit, which thus is very convenient in operation.

Further scope of applicability of the present invention will become apparent from the detailed description given hereinafter. However, it should be understood that the detailed description and specific examples, while indicating preferred embodiments of the invention, are given by way of illustration only, since various changes and modifications in the spirit and scope of the invention will become apparent to those skilled in the art from this detailed description.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

According to the thin display structure disclosed in the present invention, the thin display refers to a display, such as an LCD TV and a PDP TV, and the present invention is optimally applied to large-size thin displays.

Figure 1:
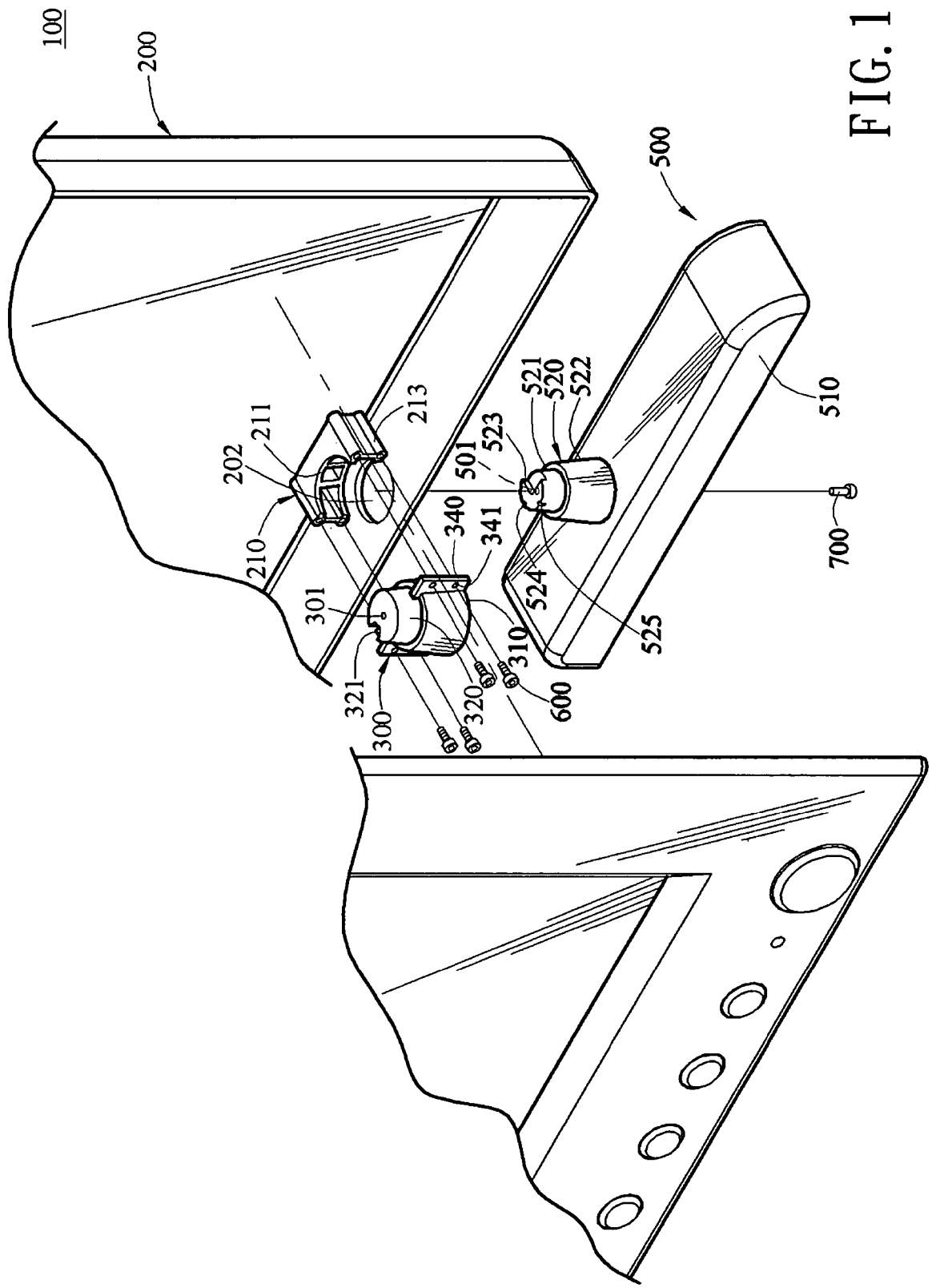
FIG. 1 is an exploded stereogram of a thin display according to a first embodiment of the present invention.
Figure 2A:
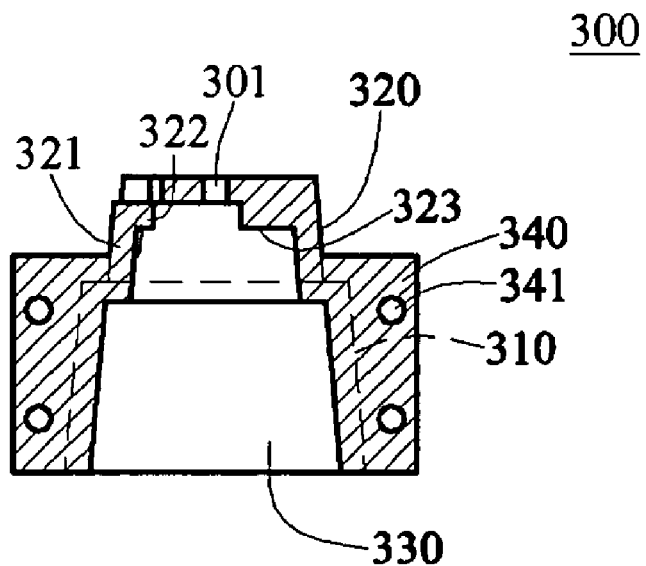
FIG. 2A is a sectional view of joining sleeves according to the first embodiment of the present invention.
Figure 2B:
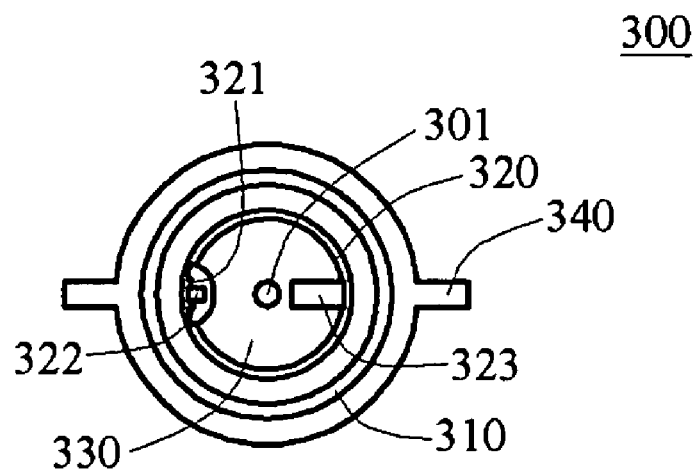
FIG. 2B is a top view of the joining sleeves according to the first embodiment of the present invention.
Figure 3:
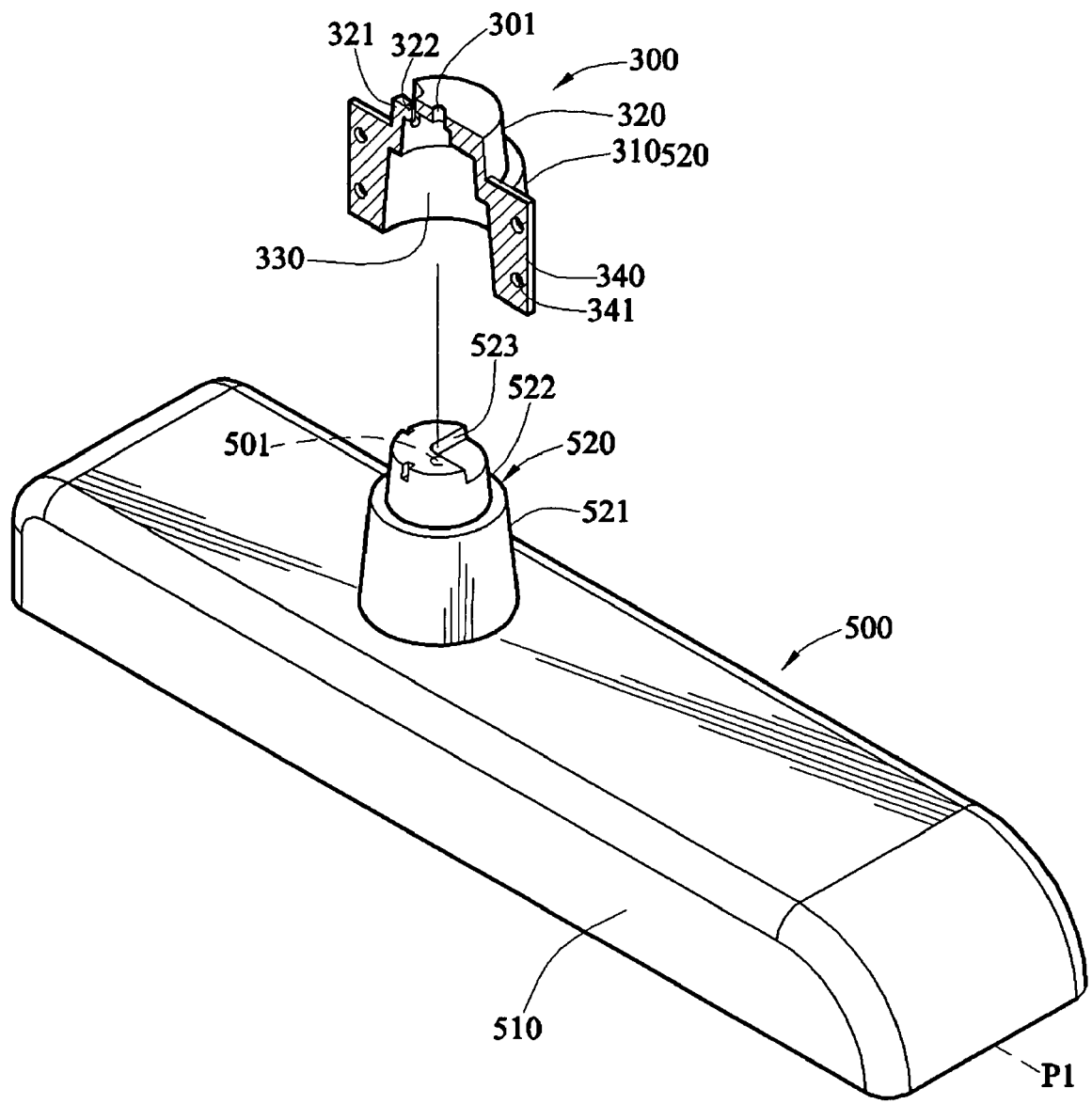
FIG. 3 is a schematic view of positions of the joining sleeve and the guide post when the support unit is at the receiving position according to the first embodiment of the present invention.
Figure 4:
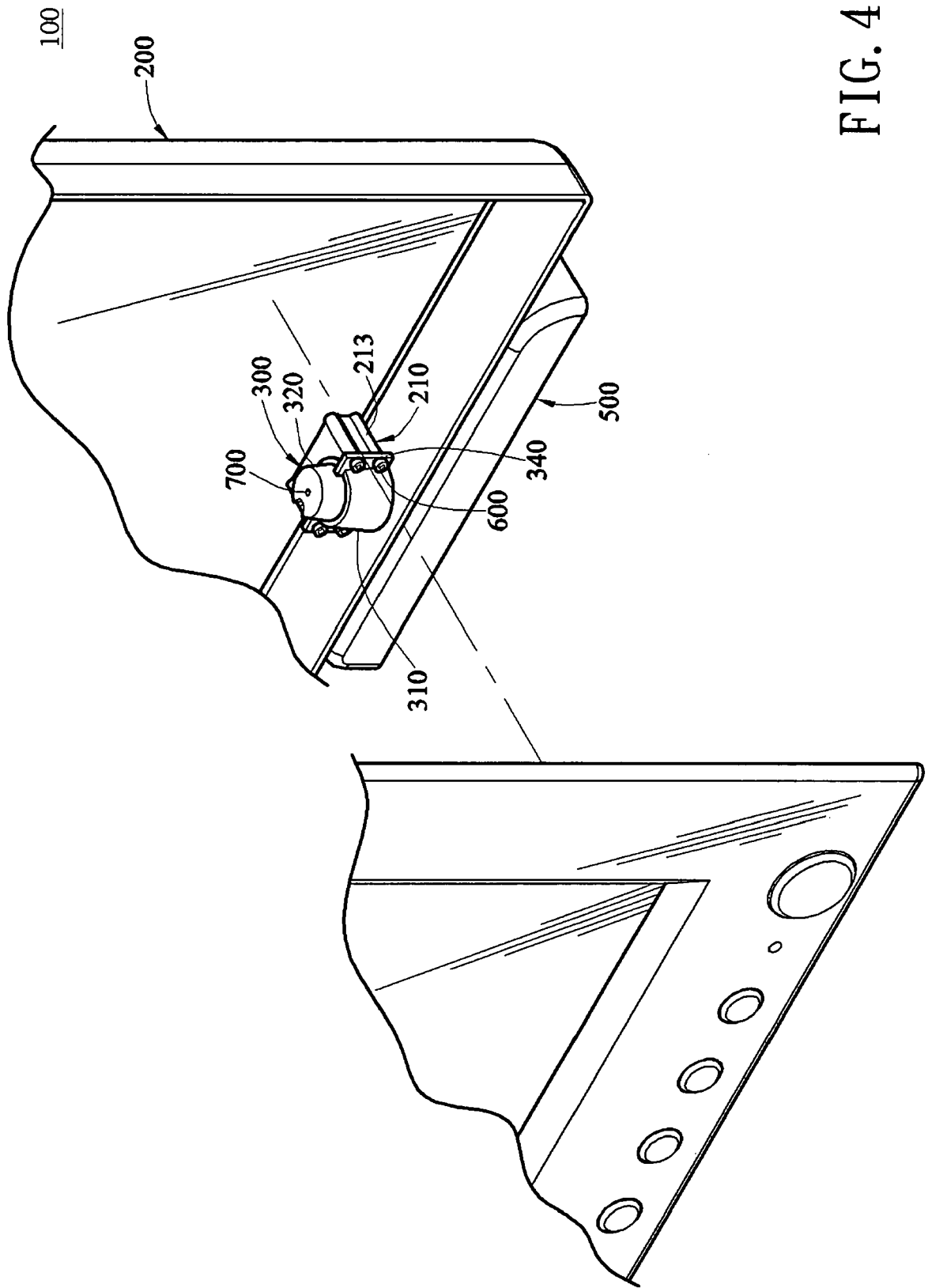
FIG. 4 is a schematic view of the support unit disposed in the joining sleeve when the support unit is at the receiving position according to the first embodiment of the present invention.
Figure 5:
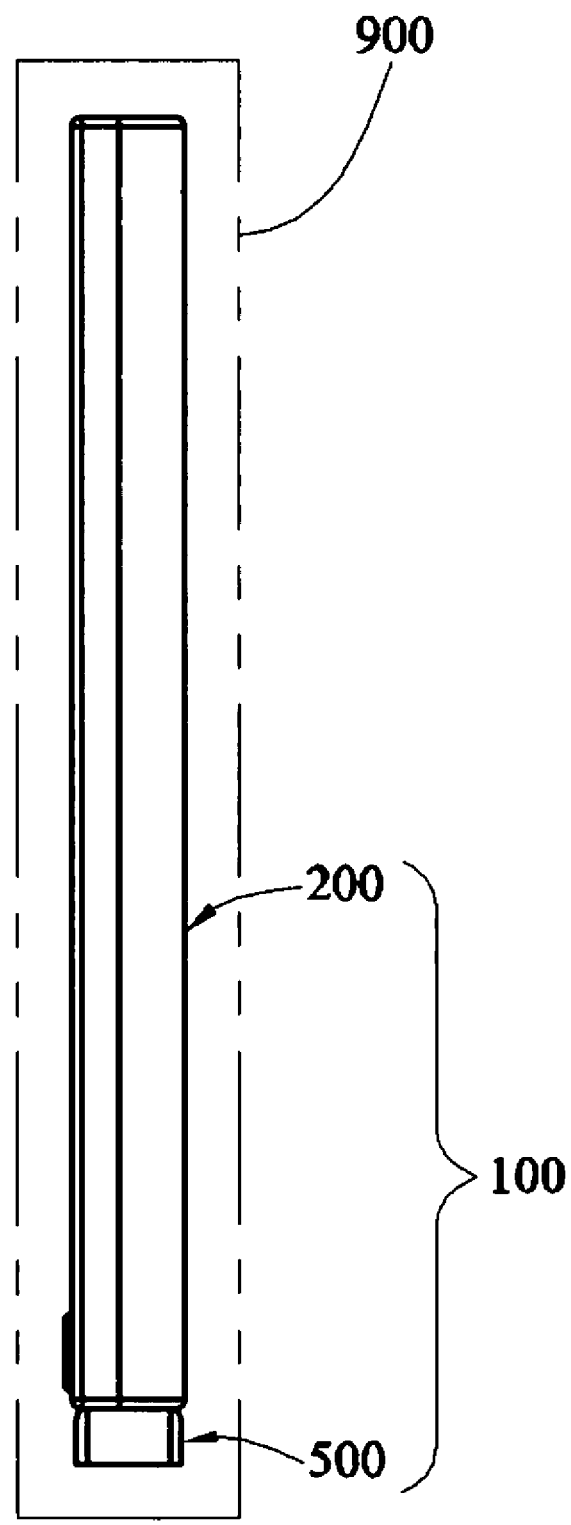
FIG. 5 is a side view of the thin display received in the packing case according to the first embodiment of the present invention.
Figure 6:
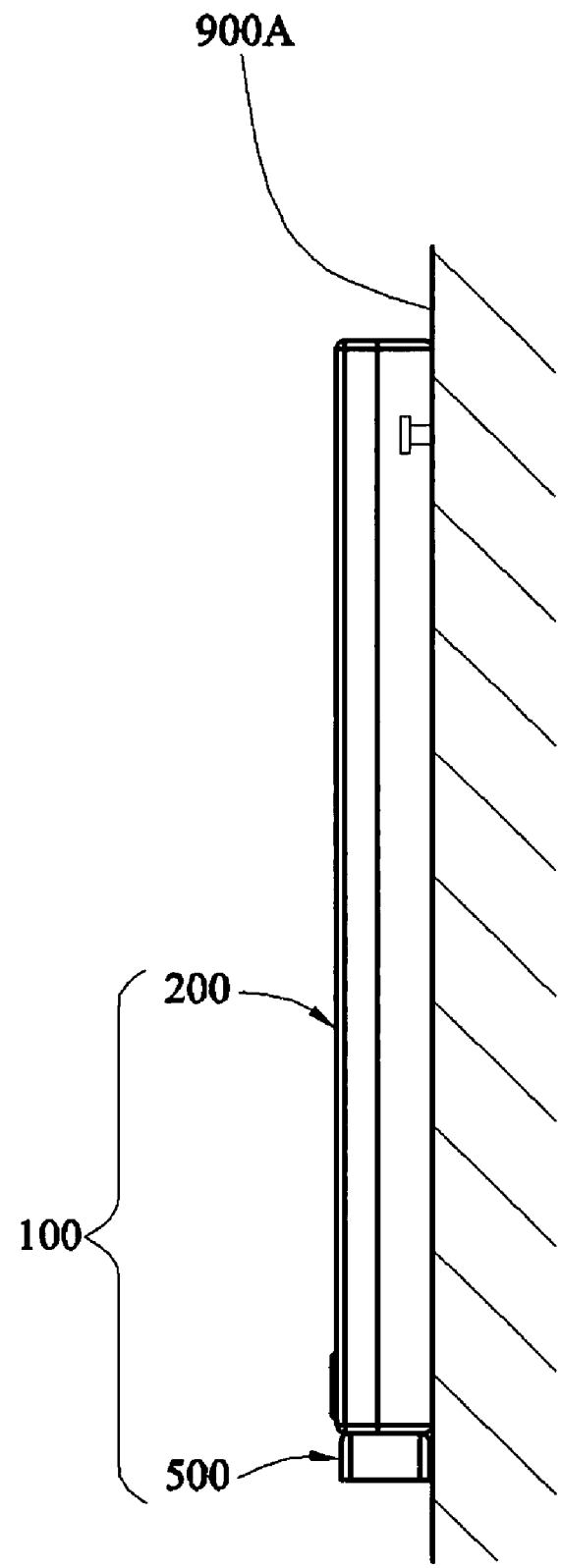
FIG. 6 is a side view of the thin display hung on the wall surface according to the first embodiment of the present invention.

Referring to FIG. 1, together with FIGS. 2A, 2B, 3, and 6, the thin display structure of the first embodiment of the present invention includes a case 200, a joining sleeve 300, and a support unit 500. The case 200 is used to cover a display panel (not shown) that is provided for the user to view the images, and thus the case 200 covers and protects the display panel. Furthermore, the case 200 has a through hole 202 at the bottom corresponding to the joining sleeve 300, for the support unit 500 to pass through. A retaining bracket 210 is disposed on the case 200 at the bottom part close to the wall surface and corresponding to the through hole 202. The retaining bracket 210 further includes a joint portion 211 and a plurality of positioning posts 213 located at two ends of the joint portion 211, and each of the positioning post 213 is provided for locking pieces 600 to pass through, so as to fix the joining sleeve 300 on the retaining bracket 210.

The joining sleeve 300 is disposed inside the bottom of the case 200, and includes an inclined taper portion 310 with a gradually reduced aperture and a packing portion 320 extending from the inclined taper portion 310, and thus, seen from the external perspective, the joining sleeve 300 appears as a step-shaped two-section structure. In addition, the joining sleeve 300 includes a chamber 330, which is formed by the inner wall surfaces of the inclined taper portion 310 and the packing portion 320. A resilient arm 321 is extended from one side of the inner wall surface of the packing portion 320, a positioning block 322 extending into the chamber 330 is disposed at one end of the resilient arm 321, and a stop block 323 is protruded from the top edge of the inner wall surface of the packing portion 320. A shaft bore 301 communicating with the chamber 330 is further disposed in the joining sleeve 300, which is provided for a shaft rod 700 to pass through. Furthermore, the joining sleeve 300 further has two catches 340, and each of the catches 340 has a plurality of perforations 341 corresponding to the positioning posts 213, for the plurality of locking pieces 600 to pass through. Each of the catches 340 is extended from an outer wall surface of the inclined taper portion 310 to an outer wall surface of the packing portion 320.

The support unit 500 has a chassis 510 with a transverse width similar to the thickness of the case 200, and a guide post 520 extending from an end surface of the chassis 510 and matched and sleeved in the chamber 330. The transverse width of the support unit 500 similar to the thickness of the case 200 means that the transverse width of the chassis 510 is slightly less than, equal to, or slightly larger than the thickness of the case 200, as long as it satisfies the requirement for supporting the case 200. However, herein, it takes the circumstance that the transverse width of the chassis 510 is slightly smaller than the thickness of the case 200 as an application example. Furthermore, the chassis 510 is rectangular-shaped, but it is not limited herein. The chassis 510 can support the case 200 to stand on a desk surface 800, and due to the proper friction generated on the bottom surface of the chassis 510, the case 200 is stably supported.

The guide post 520 is presented as a step-shaped two-section structure corresponding to the appearance of the structure of the joining sleeve 300, which includes a column portion 521 with a gradually reduced aperture and a guide portion 522 extending from the column portion 521. The guide post 520 has two retaining walls 523 pressing against the stop block 323 on the top surface of the guide portion 522, corresponding to a first buckling slot 524 and a second buckling slot 525 of the resilient arm 321. The first buckling slot 524 and the second buckling slot 525 are provided for the positioning block 322 of the resilient arm 321 to be buckled. An included angle between the two retaining walls 523 is determined according to the actual requirement, for example, 90 degrees, and the positions and number of the buckling slots are determined according to the requirement. Two buckling slots exist herein, but it is not limited herein. Furthermore, a via hole 501 communicating with the chassis 510 and the guide post 520 is further disposed in the support unit 500, which is provided for the shaft rod 700 to pass through.

It should be noted that, the number of the joining sleeves 300 is corresponding to the number of the support units 500, and the number of the support units 500 must be the minimum number that can meet the requirements for supporting the weight of the case 200 and achieving the balance, which is at least two. Herein, two support units 500 exist in the present invention, and correspondingly, two joining sleeves 300 exist, but the number of the support units 500 and that of the joining sleeves 300 are not limited to be two, but can be more than two.

Referring to FIG. 1, and together with FIGS. 3, 4, 5, 6, 7A, 7B, and 8, during the assembling process, the joining sleeve 300 is disposed at an edge of the through hole 202, such that the inclined taper portion 310 of the joining sleeve 300 is attached to the joint portion 211 of the retaining bracket 210. Meanwhile, each perforation 341 on the catches 340 is aligned with each positioning post 213 on the retaining bracket 210, and each locking piece 600 passes through each perforation 341 and each positioning post 213, such that the joining sleeve 300 is fixed on the retaining bracket 210, and thereby being joined to the case 200. Next, the guide post 520 of the support unit 500 is extended into the chamber 330 of the joining sleeve 300, and at this time, the stop block 323 presses between the two retaining walls 523 on the top surface of the guide portion 522, and the positioning block 322 of the resilient arm 321 presses against the peripheral edge of the top surface of the guide portion 522. Then, the shaft rod 700 is utilized to pass through the via hole 501 and the shaft bore 301, such that the support unit 500 is rotatably disposed in the joining sleeve 300, and the support unit 500 is joined to the case 200 through the joining sleeve 300, and thus the support unit 500 can rotate with respect to the case 200.

Figure 7A:
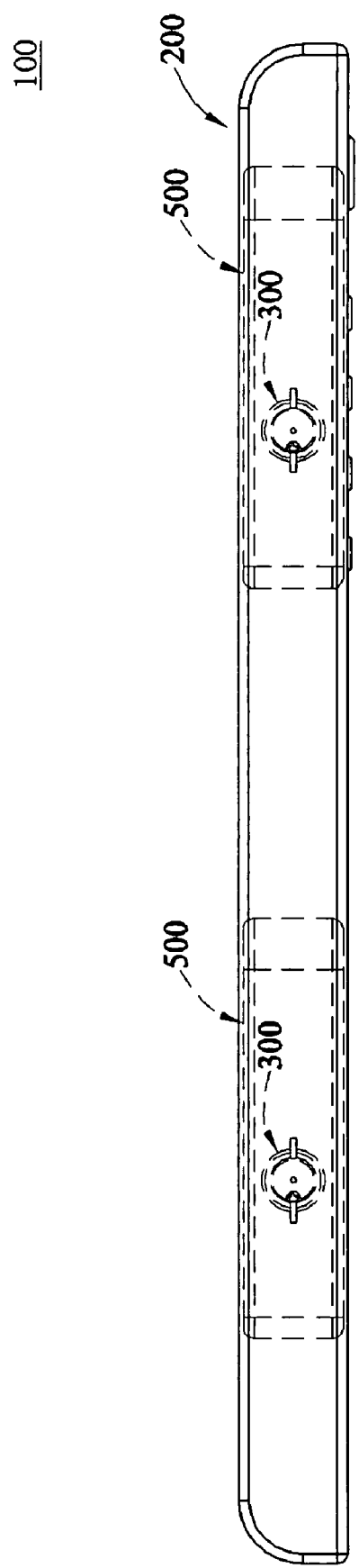
FIG. 7A is a top view of the support unit hidden in the case when locating at the receiving position according to the first embodiment of the present invention.
Figure 7B:
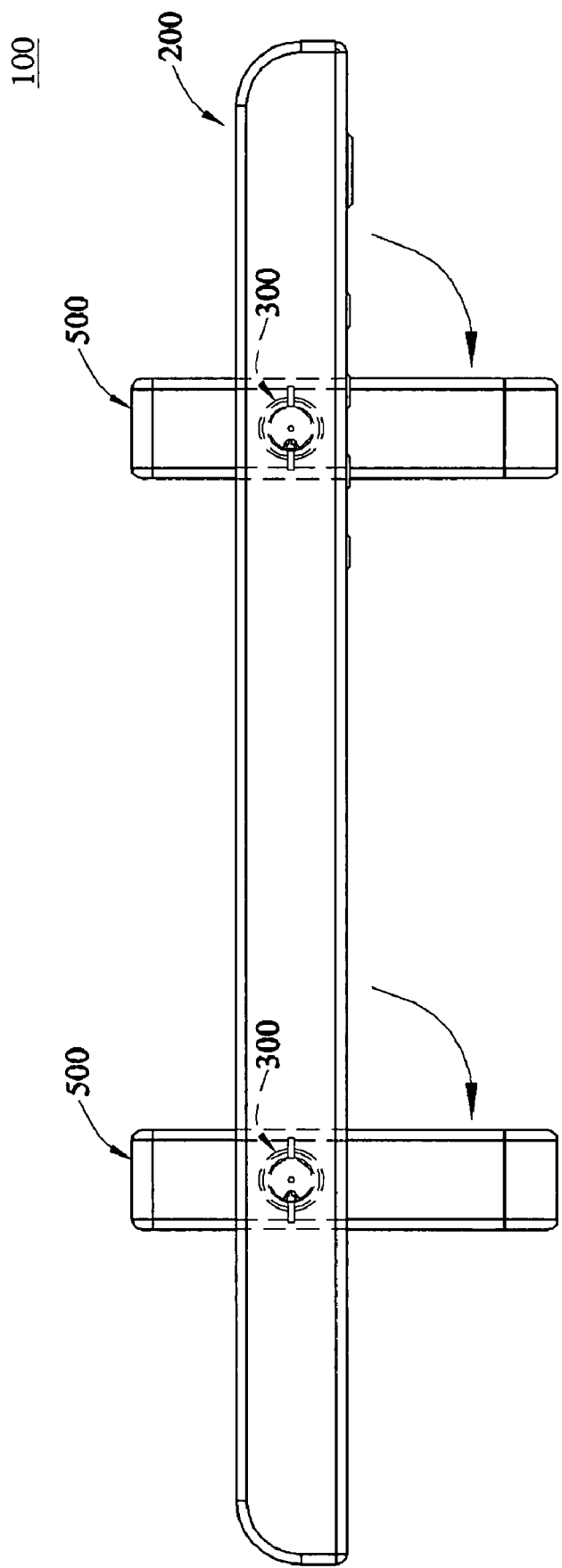
FIG. 7B is a top view of the support unit protruded from the case when locating at the supporting position according to the first embodiment of the present invention.
Figure 8:
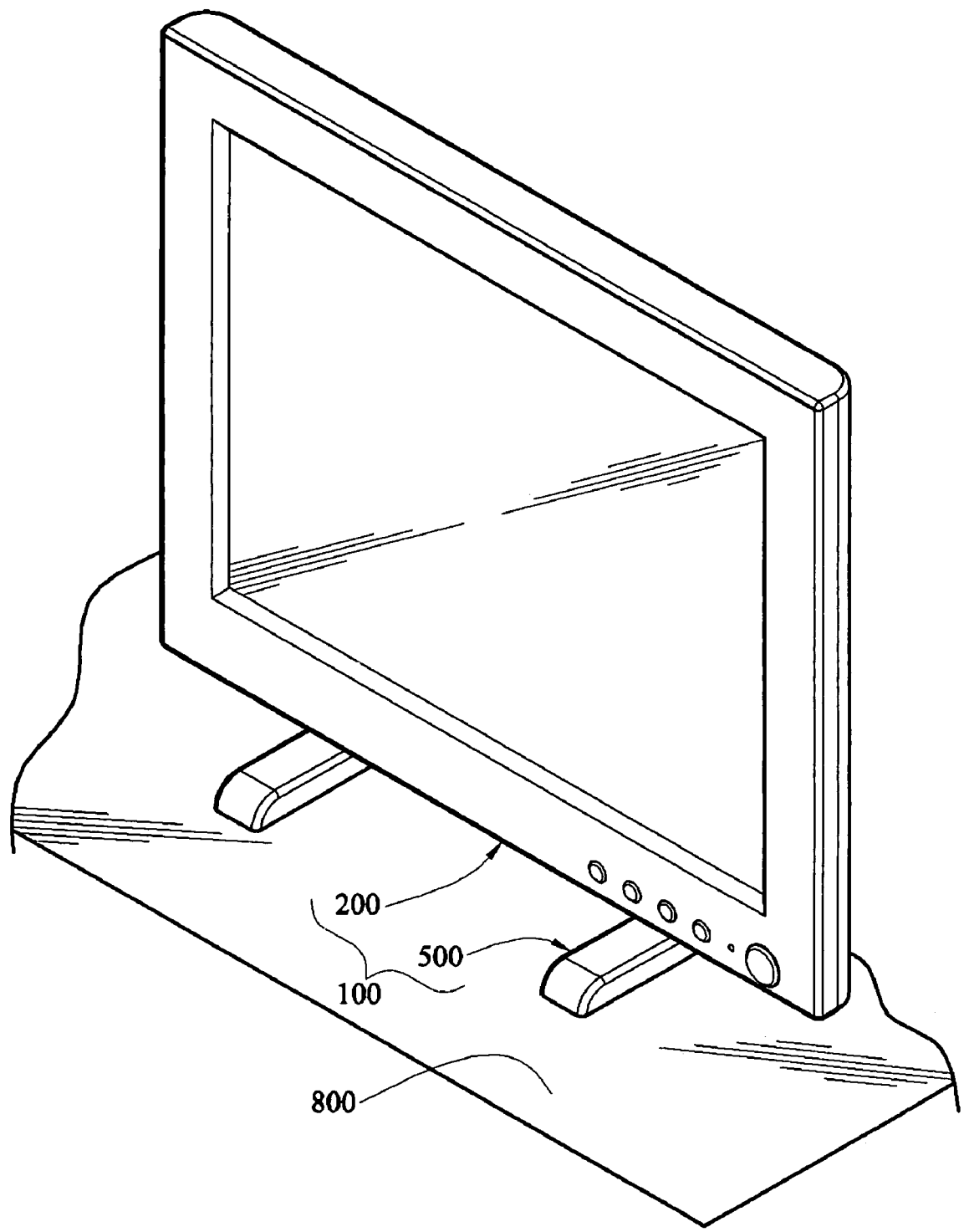
FIG. 8 is a schematic view of the thin display standing on the surface of the desk according to the first embodiment of the present invention.
Figure 9:
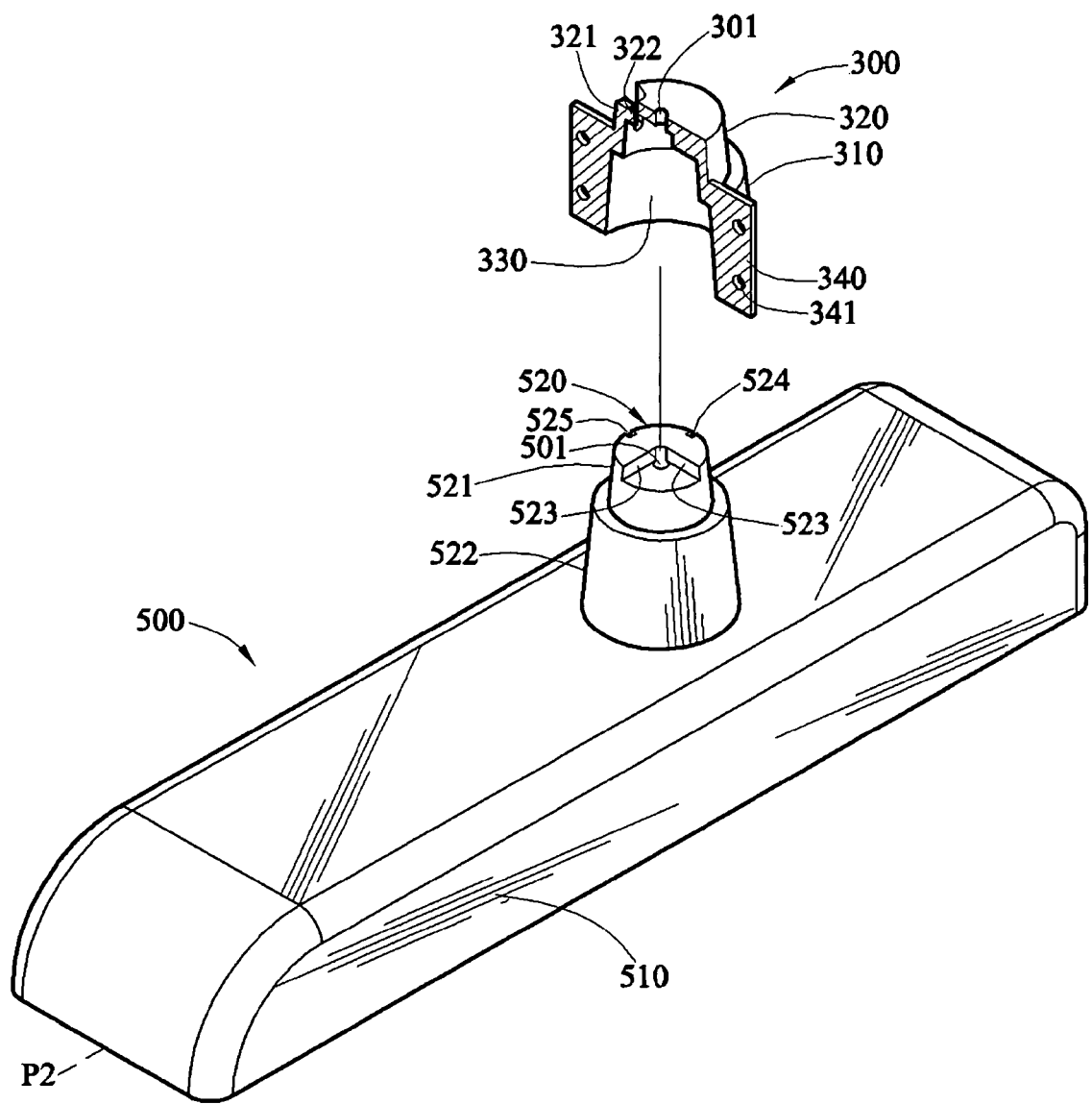
FIG. 9 is a schematic view of positions of the joining sleeve and the guide post when the support unit is at the supporting position according to the first embodiment of the present invention.

For example, the support unit 500 can be hidden in the case 200 by rotating with respect to the case 200, and thus the support unit 500 is at a receiving position P1. Seen from the external perspective, the support unit 500 does not protrude from the thin display 100, and the thin display 100 can be received in a packing case 900 or hung on a wall surface 900A. Alternatively, the support unit 500 is protruded from the case 200 by rotating with respect to the case 200, and thus the support unit 500 is at a supporting position P2, such that the thin display 100 stands on the desk surface 800. It should be noted that, no matter each support unit 500 is rotated to be hidden in the case 200 or be protruded from the case 200, the rotating directions for the two support units 500 are the same, which is convenient for the user to rotate the support units 500. For example, if the two support units 500 have already been hidden in the case 200, by rotating the two support units 500 in a clockwise direction, the support units 500 are protruded from the case 200 (as shown in FIGS. 7A and 7B). Definitely, the support units also can be rotated towards different directions.

Referring to FIGS. 3, 5, 6, 8, and 9, since the transverse width of the chassis 510 is slightly less than the thickness of the case 200, when receiving the thin display 100 in the packing case 900, the user can rotate each of the support units 500, such that the stop block 323 presses against one of the retaining walls 523, and the positioning block 322 of the resilient arm 321 is buckled in the first buckling slot 524, and thus the support unit 500 is hidden in the case 200 and thereby being fixed, that is, at the receiving position P1. Therefore, as seen from the side edge of the thin display 100, when the thin display 100 is received in the packing case 900, since the transverse width of the support unit 500 is slightly smaller than the thickness of the case 200, besides the necessary buffer materials to absorb the impact to the thin display 100 by an external force, the width of the packing case 900 is designed with reference to the thickness of the case 200, so as to be designed as approaching the volume of the case 200. Therefore, the volume of the packing case 900 is greatly reduced, which is convenient for transportation.

Furthermore, when the support unit 500 is at the receiving position P1, the thin display 100 not only can be received in the packing case 900, but also can be hung on the wall surface 900A by the user. When the support unit 500 has been hidden in the case 200, it is not protruded from the case 200, so it is not required to be taken off from the case 200. Seen from the external perspective, the overall external appearance of the thin display 100 is presented to be relatively uniform, which makes the user feel comfortable in sight, and it is convenient for the user to hang at any angle.

In addition, when the thin display 100 is to be placed on the desk surface 800, the user may again rotate each of the support units 500, such that the stop block 323 presses against one of the retaining walls 523, and the positioning block 322 of the resilient arm 321 is buckled in the second buckling slot 525, the support unit 500 protrudes from the case 200, the support unit 500 is at the supporting position P2, such that the support unit 500 makes the thin display 100 stably stand on the desk surface 800. When the user rotates the support unit 500, the rotation angle for the support unit 500 is determined by an included angle between the two retaining walls 523, that is, the user rotates the support unit 500, such that the two retaining walls 523 are respectively pressed against the stop block 323, and thus the user cannot further rotate the support unit 500 towards the same direction, therefore, the rotation range of the support unit 500 is restricted. However, the user can still rotate the support unit 500 towards an opposite direction, as a result, the support unit 500 cannot be well fixed at the receiving position P1 or the supporting position P2. Therefore, through the design of the positioning means of the resilient arm 321, the first buckling slot 524, and the second buckling slot 525, when the user rotates the support unit 50 to make the stop block 323 press against each of the retaining walls 523, the positioning block 322 is buckled in the first buckling slot 524 or the second buckling slot 525, so as to remind the user that the support unit 500 has already reached the receiving position P1 or the supporting position P2.

As for the positioning means disclosed in the first embodiment, the resilient arm 321 is disposed on the joining sleeve 300, and the first buckling slot 524 and the second buckling slot 525 are disposed on the support unit 500, that is, the resilient arm 321 is disposed on the fixed joining sleeve 300, and the first buckling slot 524 and the second buckling slot 525 are disposed on the rotatable support unit 500. However, in the thin display structure according to the present invention, the positioning means is not limited to the configuration in the first embodiment, for example, the resilient arm 321 is disposed at the other places on the case 200, and the first buckling slot 524 and the second buckling slot 525 are disposed at the other places on the support unit 500, or, the positions of the resilient arm 321, and the first buckling slot 524 and the second buckling slot 525 are reversed with each other, and the positioning purpose of the present invention can also be achieved. Please further refer to a second embodiment, a third embodiment, a fourth embodiment, and a fifth embodiment of the present invention.

Figure 10:
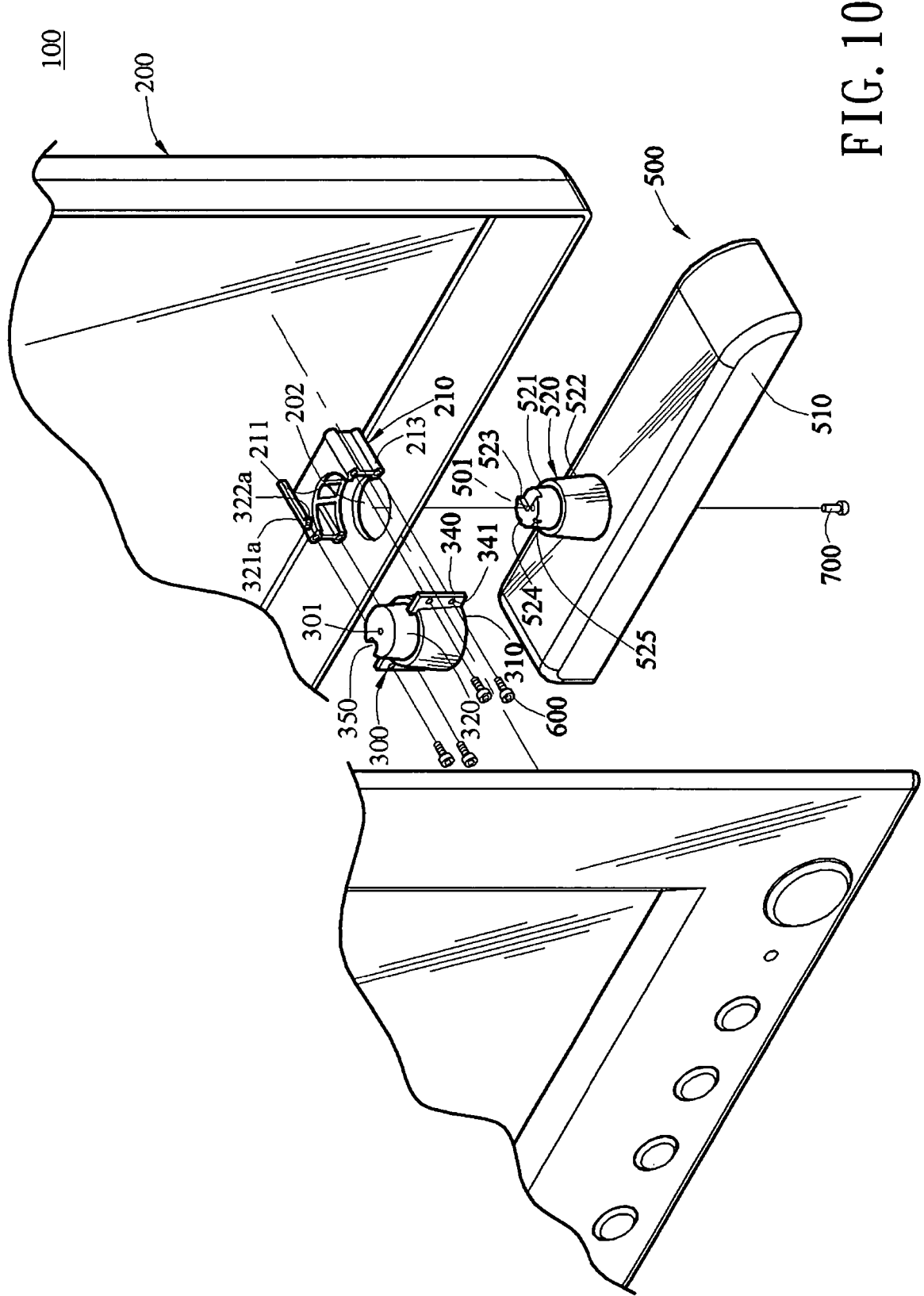
FIG. 10 is an exploded stereogram of a thin display according to a second embodiment of the present invention.

As shown in FIG. 10, a thin display structure according to a second embodiment of the present invention is shown. The structure of the second embodiment is substantially the same as that of the first embodiment, with the only difference lying in that, the resilient arm 321a of the second embodiment is disposed on the case 200 instead of on the joining sleeve 300. The resilient arm 321a is extended from the case 200 corresponding to the top edge of the joining sleeve 300, and corresponding to a notch 350 of the support unit 500. A positioning block 322a is disposed at the front end of the resilient arm 321a corresponding to the notch, and the positioning block 322a can be extended into the notch 350. It should be noted that, the resilient arm 321a also can be disposed on the retaining bracket 210, but herein, it is taken as an application example that the resilient arm 321a is directly disposed on the case 200.

When the support unit 500 is rotated and adjusted to the receiving position P1 or the supporting position P2, the positioning block 322a of the resilient arm 321a also can be buckled in the first buckling slot 524 and the second buckling slot 525.

Figure 11A:
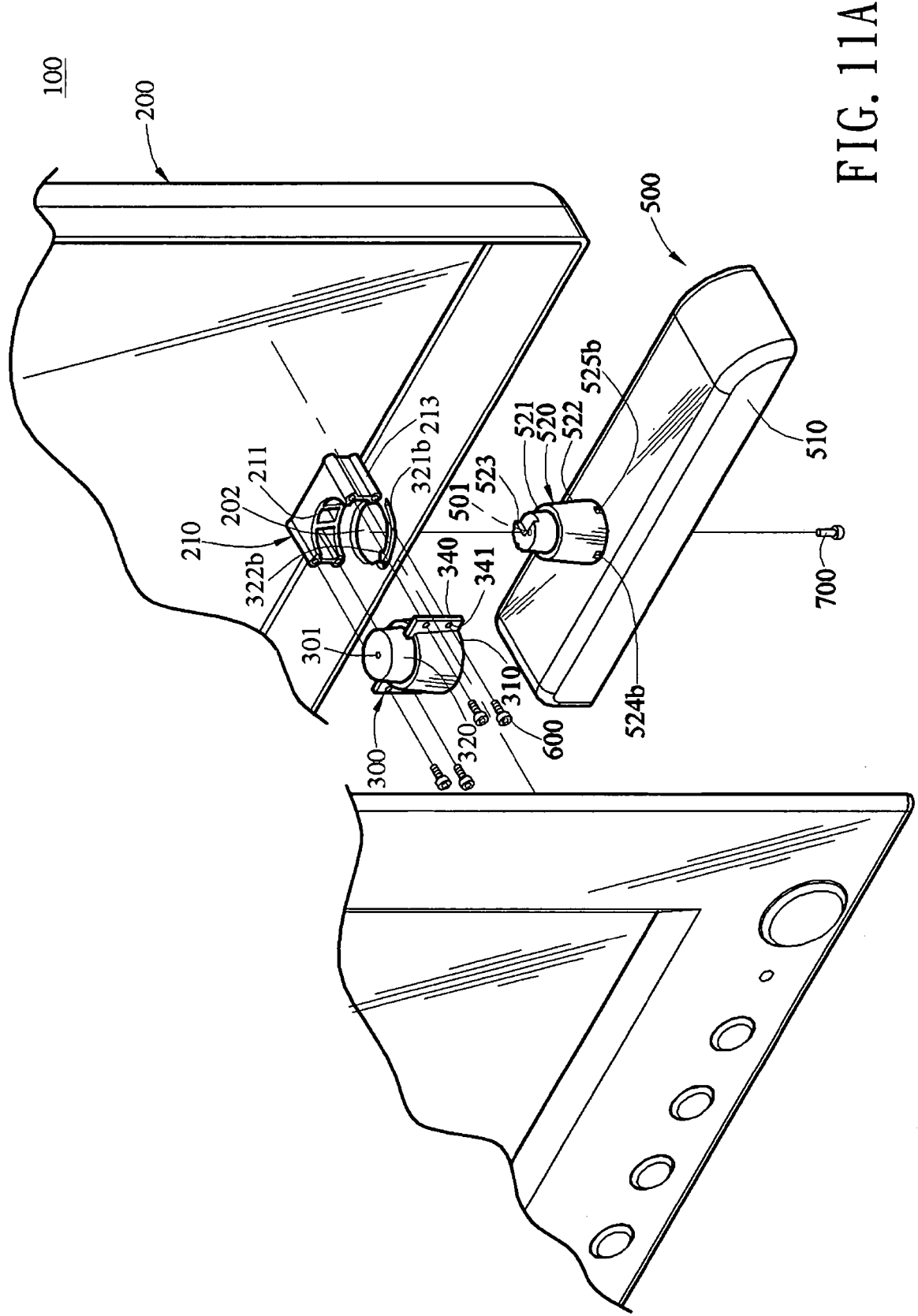
FIG. 11A is an exploded stereogram of a thin display according to a third embodiment of the present invention.
Figure 11B:
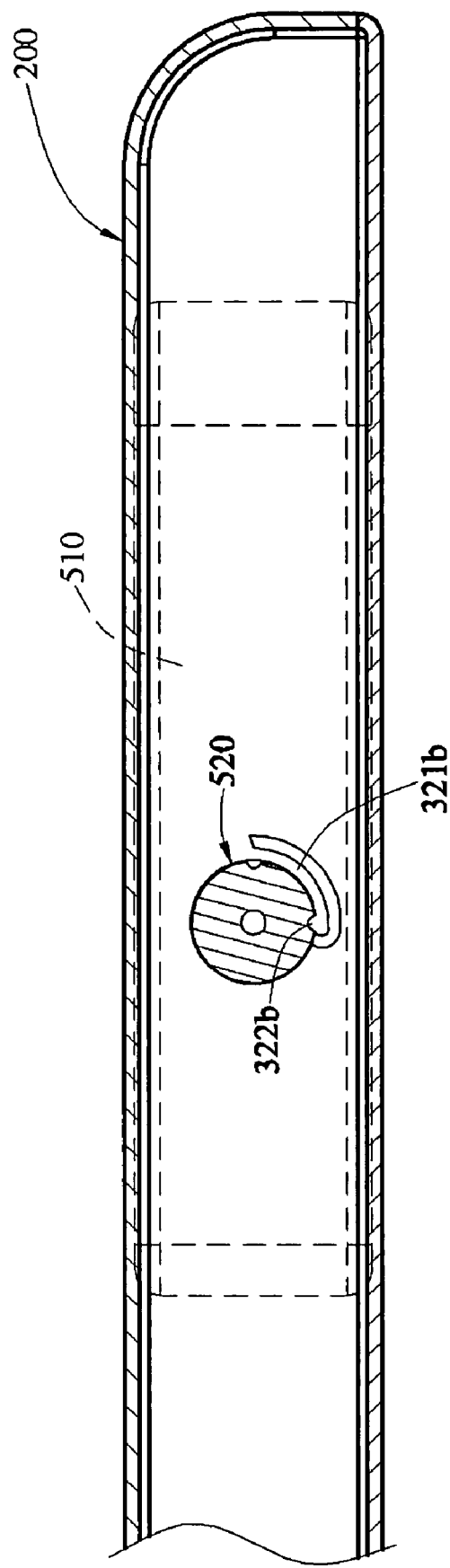
FIG. 11B is a schematic sectional view of the third embodiment of the present invention.

Referring to FIGS. 11A and 11B, a thin display structure according to a third embodiment of the present invention is shown. The structure of the third embodiment is substantially the same as that of the second embodiment, with the only difference lying in that, the resilient arm 321b of the third embodiment is disposed at the through hole 202 of the case 200. The resilient arm 321b is extended from the through hole 202 of the case 200, and has a positioning block 322b at the front end. Since the through hole 202 is located at the bottom of the case 200, a positioning ring (not shown) is disposed on the chassis 510 of the support unit 500 along the bottom of the guide portion 522, and a first buckling slot 524b and a second buckling slot 525b are disposed on the positioning ring. When the support unit 500 is sleeved in the joining sleeve 300, the resilient arm 321b is just corresponding to the positioning ring. Similarly, when the support unit 500 is rotated and adjusted to the receiving position P1 or the supporting position P2, the positioning block 322b of the resilient arm 321b also can be buckled in the first buckling slot 524b and the second buckling slot 525b.

Figure 12:
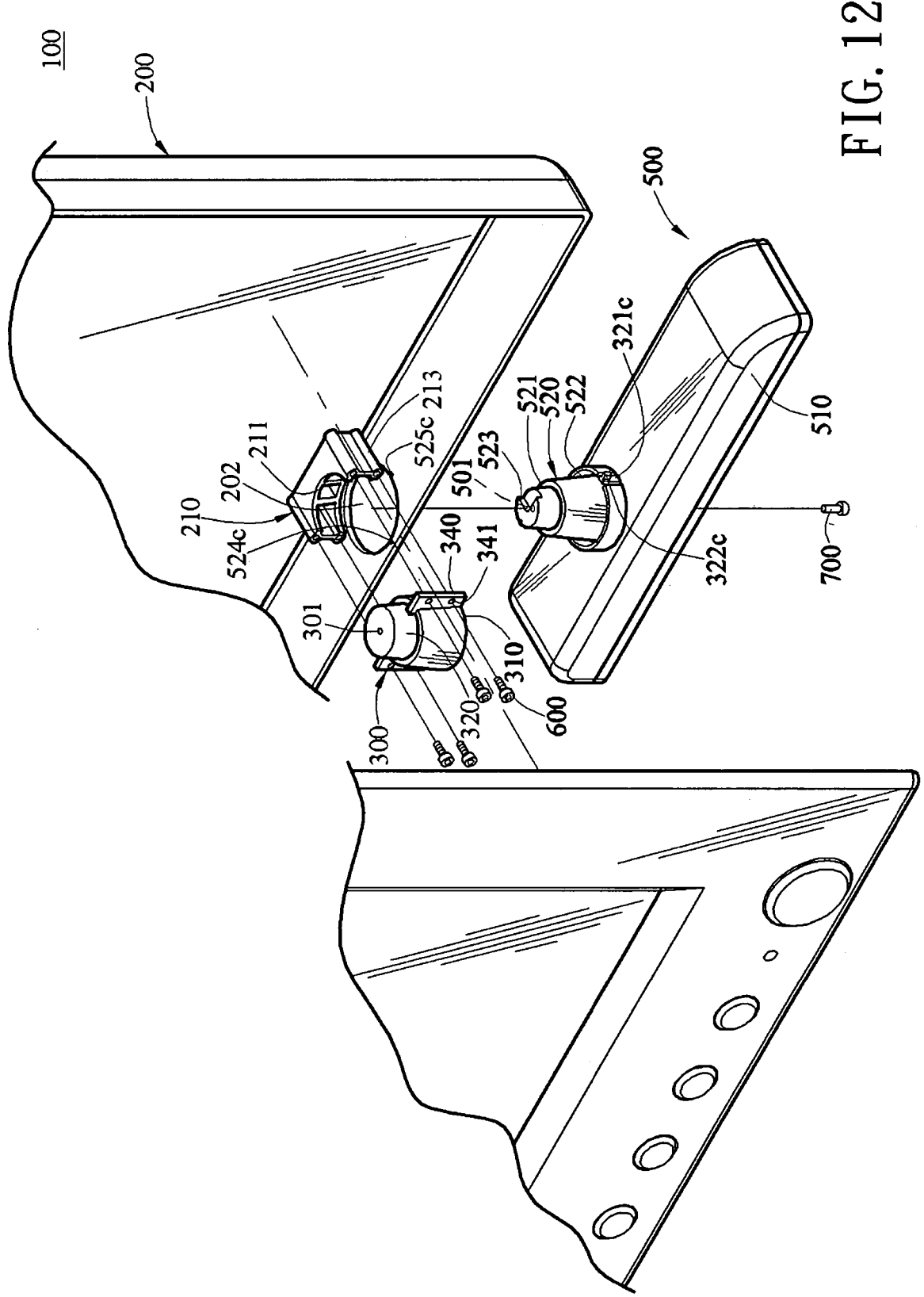
FIG. 12 is an exploded stereogram of a thin display according to a fourth embodiment of the present invention.

As shown in FIG. 12, a thin display structure according to a fourth embodiment of the present invention is shown. The structure of the fourth embodiment is substantially the same as that of the third embodiment, with the only difference lying in that, the positions of the resilient arm 321c, and the first buckling slot 524c and the second buckling slot 525c in the fourth embodiment are opposite to those in the third embodiment. The first buckling slot 524c and the second buckling slot 525c are disposed at the through hole 202 of the case 200, and the resilient arm 321c is disposed on the positioning ring, and the positioning block 322c at the front end of the resilient arm 321c faces the outer side. When the support unit 500 is sleeved in the joining sleeve 300, the resilient arm 321c is just corresponding to the through hole 202. Similarly, when the support unit 500 is rotated and adjusted to the receiving position P1 or the supporting position P2, the positioning block 322c of the resilient arm 321c can also be buckled in the first buckling slot 524c and the second buckling slot 525c.

Figure 13:
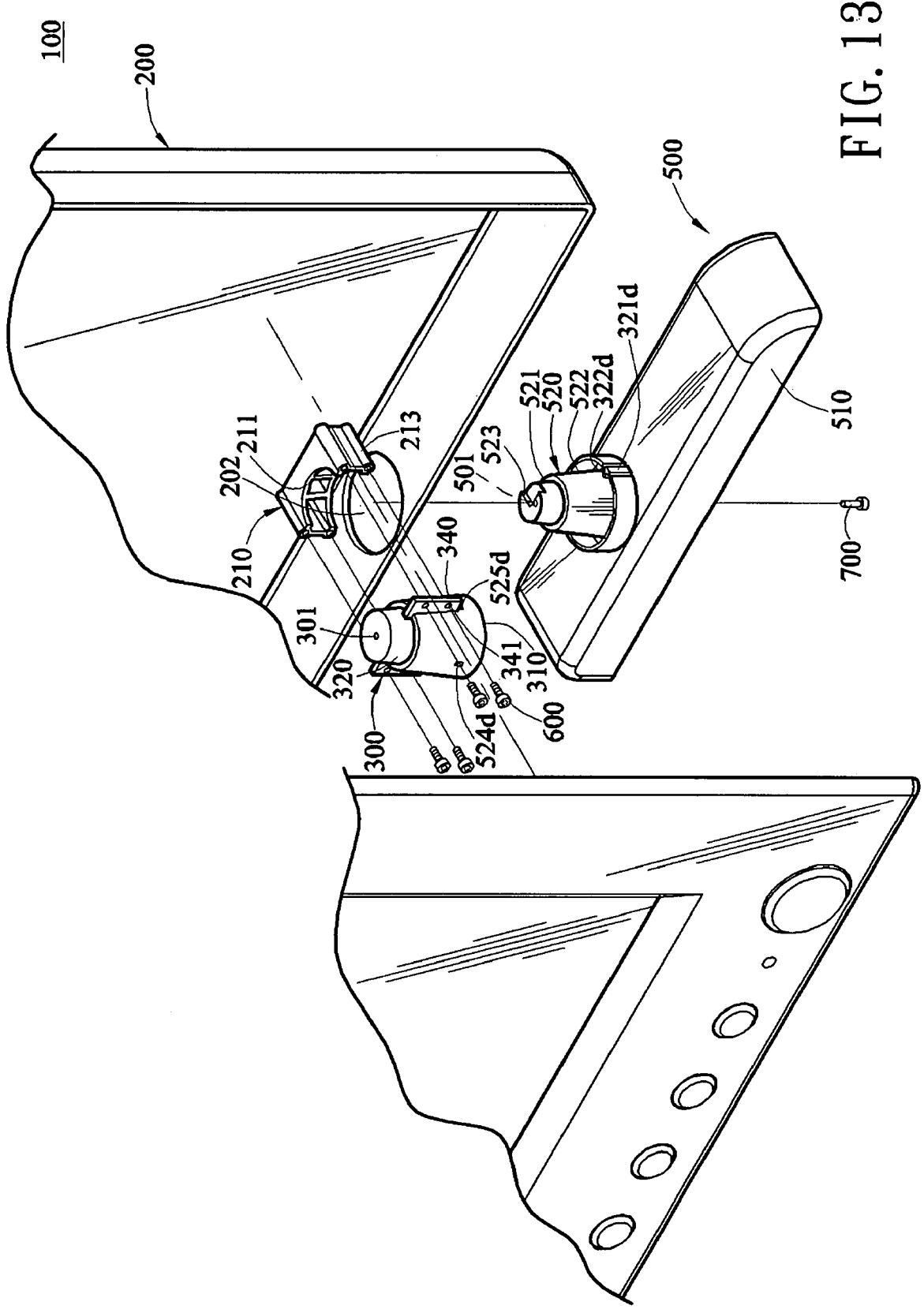
FIG. 13 is an exploded stereogram of a thin display according to a fifth embodiment of the present invention.

As shown in FIG. 13, a thin display structure according to a fifth embodiment of the present invention is shown. The structure of the fifth embodiment is substantially the same as that of the fourth embodiment, with the only difference lying in that, the positioning block 322d at the front end of the resilient arm 321d faces the inner side in the fifth embodiment, and the first buckling slot 524d and the second buckling slot 525d are disposed on the joining sleeve 300. The first buckling slot 524d and the second buckling slot 525d are disposed close to the bottom edge of the inclined taper portion 310 of the joining sleeve 300, the resilient arm 321c is disposed on the positioning ring, and the positioning block 322d at the front end of the resilient arm 321d faces the inner side. When the support unit 500 is sleeved in the joining sleeve 300, the resilient arm 321d is just corresponding to the first buckling slot 524d and the second buckling slot 525d on the joining sleeve 300. Similarly, when the support unit 500 is rotated and adjusted to the receiving position P1 or the supporting position P2, the positioning block 322d of the resilient arm 321d also can be buckled in the first buckling slot 524d and the second buckling slot 525d.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A thin display structure, comprising:
a case, for disposing a display panel;
at least two joining sleeves, disposed inside a bottom of the case, and having a chamber and a shaft bore communicating with the chamber, wherein a stop block is disposed at a top edge of an inner wall surface of the chamber;
at least two support units, having a chassis with a transverse width similar to a thickness of the case, a guide post extending from an end surface of the chassis and matched and sleeved in the chamber, and a via hole communicating with the chassis and the guide post, wherein the guide post has two retaining walls pressing against the stop block, and a shaft rod passes through the shaft bore and the via hole, such that the support unit is rotatably disposed in the joining sleeve; and
a positioning means, having a resilient arm disposed at the case, and a first buckling slot and a second buckling slot disposed on the support unit, wherein the support unit rotates with respect to the joining sleeve, the stop block presses against the retaining wall, and the resilient arm is buckled in the first buckling slot or the second buckling slot, such that the support unit has a receiving position hiding in the case and a supporting position protruding from the case.

2. The thin display structure as claimed in claim 1, wherein the case has a through hole disposed in a bottom part corresponding to the joining sleeve, for the support unit to pass through and be disposed in the joining sleeve.

3. The thin display structure as claimed in claim 2, wherein the case has a retaining bracket disposed at the bottom part close to wall surface and corresponding to the through hole, and the retaining bracket further comprises a joint portion and a plurality of positioning posts located at two ends of the joint portion, and each of the positioning posts is provided for a plurality of locking pieces to pass through, so as to fix the joining sleeve on the retaining bracket.

4. The thin display structure as claimed in claim 3, wherein the joining sleeve further has two catches, each of the catches has a plurality of perforations corresponding to each of the positioning posts for each of the locking pieces to pass through.

5. The thin display structure as claimed in claim 1, wherein the joining sleeve has an inclined taper portion with a gradually reducing aperture and a packing portion extending from the inclined taper portion, and the chamber is formed by inner wall surfaces of the inclined taper portion and the packing portion.

6. The thin display structure as claimed in claim 1, wherein the resilient arm has a positioning block extending towards the chamber at one end, for buckling with the first buckling slot or the second buckling slot.

7. The thin display structure as claimed in claim 1, wherein the resilient arm of the positioning means extends from the case.

8. The thin display structure as claimed in claim 2, wherein the resilient arm of the positioning means extends from the through hole.

9. The thin display structure as claimed in claim 1, wherein the guide post has a column portion with a gradually reducing aperture and a guide portion extending from the column portion.

10. A thin display structure, comprising:
a case, for disposing a display panel;
at least two joining sleeves, disposed inside a bottom of the case, and having a chamber and a shaft bore communicating with the chamber, wherein a stop block is disposed at a top edge of an inner wall surface of the chamber;
at least two support units, having a chassis with a transverse width similar to a thickness of the case, a guide post extending from an end surface of the chassis and matched and sleeved in the chamber, and a via hole communicating with the chassis and the guide post, wherein the guide post has two retaining walls pressing against the stop block, and a shaft rod passes through the shaft bore and the via hole, such that the support unit is rotatably disposed in the joining sleeve; and
a positioning means, having a resilient arm disposed in the joining sleeve, and a first buckling slot and a second buckling slot disposed on the support unit, wherein the support unit rotates with respect to the joining sleeve, the stop block presses against the retaining wall, and the resilient arm is buckled in the first buckling slot or the second buckling slot, such that the support unit has a receiving position hiding in the case and a supporting position protruding from the case.

11. A thin display structure, comprising:

a case, for disposing a display panel;

at least two joining sleeves, disposed inside a bottom of the case, and having a chamber and a shaft bore communicating with the chamber, wherein a stop block is disposed at a top edge of an inner wall surface of the chamber;

at least two support units, having a chassis with a transverse width similar to a thickness of the case, a guide post extending from an end surface of the chassis and matched and sleeved in the chamber, and a via hole communicating with the chassis and the guide post, wherein the guide post has two retaining walls pressing against the stop block, and a shaft rod passes through the shaft bore and the via hole, such that the support unit is rotatably disposed in the joining sleeve; and a positioning means, having a resilient arm disposed at the support unit, and a first buckling slot and a second buckling slot disposed on the case, wherein the support unit rotates with respect to the joining sleeve, the stop block presses against the retaining wall, and the resilient arm is buckled in the first buckling slot or the second buckling slot, such that the support unit has a receiving position hiding in the case and a supporting position protruding from the case.

12. The thin display structure as claimed in claim 11, wherein the case has a through hole disposed in a bottom part corresponding to the joining sleeve, for the support unit to pass through and be disposed in the joining sleeve.

13. The thin display structure as claimed in claim 12, wherein the case has a retaining bracket at a bottom part close to wall surface and corresponding to the through hole, and the retaining bracket further comprises a joint portion and a plurality of positioning posts located at two ends of the joint portion, and each of the positioning posts is provided for a plurality of locking pieces to pass through, so as to fix the joining sleeve on the retaining bracket.

14. The thin display structure as claimed in claim 13, wherein the joining sleeve further has two catches, each of the catches has a plurality of perforations corresponding to each of the positioning posts for each of the locking pieces to pass through.

15. The thin display structure as claimed in claim 11, wherein the joining sleeve has an inclined taper portion with a gradually reducing aperture and a packing portion extending from the inclined taper portion, and the chamber is formed by inner wall surfaces of the inclined taper portion and the packing portion.

16. The thin display structure as claimed in claim 11, wherein the resilient arm has a positioning block extending towards the chamber at one end, for buckling with the first buckling slot or the second buckling slot.

17. The thin display structure as claimed in claim 16, wherein the resilient arm of the positioning means is disposed on a positioning ring of the support unit, the positioning block faces an outer side, and the first buckling slot and the second buckling slot are disposed at a bottom edge of the joining sleeve.

18. The thin display structure as claimed in claim 16, wherein the positioning block faces an inner side, and the first buckling slot and the second buckling slot are disposed on the case.

19. The thin display structure as claimed in claim 11, wherein the guide post has a column portion with a gradually reducing aperture and a guide portion extending from the column portion.

* * * * *